(12) United States Patent
Takagi

(10) Patent No.: US 6,375,322 B2
(45) Date of Patent: Apr. 23, 2002

(54) FRONT HOOK EYEGLASSES AND METHOD OF ATTACHING FRONT HOOK EYEGLASSES ONTO EYEGLASSES BODY

(75) Inventor: Kazuo Takagi, Sabae (JP)

(73) Assignee: Horikawa Co., Ltd., Sabae (JP)

( * ) Notice: Subject to any disclaimer, the term of this patent is extended or adjusted under 35 U.S.C. 154(b) by 0 days.

(21) Appl. No.: 09/777,385

(22) Filed: Feb. 6, 2001

(30) Foreign Application Priority Data

Apr. 20, 2000 (JP) ........................................ 2000-119937

(51) Int. Cl.$^7$ ................................................ G02C 9/00
(52) U.S. Cl. .............................. 351/47; 351/48; 351/57
(58) Field of Search ............................. 351/47, 57, 48, 351/58, 41

(56) References Cited

U.S. PATENT DOCUMENTS 3,171,134 A * 3/1965 Kennedy ..................... 351/47
4,247,178 A * 1/1981 Cook ........................... 351/47
5,118,178 A * 6/1992 Tuckman ...................... 351/57

FOREIGN PATENT DOCUMENTS

JP 3054606 9/1998

* cited by examiner

*Primary Examiner*—Hung Xuan Dang
(74) *Attorney, Agent, or Firm*—Flynn, Thiel, Boutell & Tanis, P.C.

(57) ABSTRACT

A method of attaching front hook eyeglasses onto an eyeglasses body with safety without producing any play therebetween. The method comprises the steps of rendering a curvature of a front curve of the front hook eyeglasses larger than that of the eyeglasses body, attaching a central portion of the front hook eyeglasses onto a central portion of the eyeglasses body, and bringing both ends of the front hook eyeglasses into elastically contact with the eyeglasses body. Vertical or horizontal motion (vertical and horizontal displacement) of the front hook eyeglasses or back and forth motion of the front hook eyeglasses are controlled or restrained.

26 Claims, 9 Drawing Sheets

FRONT HOOK EYEGLASSES AND METHOD OF ATTACHING FRONT HOOK EYEGLASSES ONTO EYEGLASSES BODY

BACKGROUND OF THE INVENTION

1. Field of the Invention

The invention relates to front hook eyeglasses to be detachably attached onto eyeglasses body, more particularly to front hook eyeglasses to be simply attached onto the front portion of the eyeglasses body with assurance utilizing at least an elastic force, and a method of attaching the front hook eyeglasses onto the eyeglasses body.

2. Related Art

Not only a mere design but also various high functions have been recently required by eyeglasses.

Eyeglasses are roughly classified into two types, namely, those mounting thereon lenses for correcting eyesight and those mounting lenses for cutting out ultraviolet, (hereinafter referred to as UV cut lenses) (so-called sunglasses).

Since these eyeglasses have to be normally individually used depending on use thereof, it is necessary to prepare the foregoing two types of eyeglasses in the case of avoiding ultraviolet when going out of doors, which is very troublesome.

In view of the foregoing circumstances, eyeglasses having a simple construction and provided with UV cut function in the eyeglasses body, if need be, so-called front hook eyeglasses have been used.

The front hook eyeglasses are very convenient because UV cut lenses of the front hook eyeglasses are easily detachably attached onto the eyeglasses body, if need be.

Meanwhile, as means for attaching the front hook eyeglasses onto the eyeglasses body, there is proposed specific holding means provided in the front hook eyeglasses by way of which the front hook eyeglasses are detachably attached onto the front portion of the eyeglasses body. Most of the holding means comprises clip means for placing the front hook eyeglasses on the front portion or front surface of the eyeglasses body so that the former is caught or supported by the latter.

However, according to the method using the clip means, the front hook eyeglasses are weak relative to a force applied to the right and left directions (toward the direction of the lens surfaces), and is easily displaced from a given position because it slides.

Moreover, a clip of the clipping means is easily bent and an interval between both ends of the clip is liable to be widened (clip is loosened) when the front hook eyeglasses are repeatedly detached from and attached onto the eyeglasses body, causing a problem that a play is produced between the front hook eyeglasses and the eyeglasses body.

If such a problem occurs, it is impossible to fix the front hook eyeglasses to the eyeglasses body with assurance, and the mounting or attaching of the front hook eyeglasses onto the eyeglasses body becomes unstable. Further, when the front hook eyeglasses is repeatedly attached onto the eyeglasses body, there is a possibility that the clip damages the lens surfaces of the eyeglasses body.

Under the circumstances, front hook eyeglasses are developed as disclosed, for example, in Japanese Utility Model Registration No. 3,054 606, which discloses that the front hook eyeglasses are detachably attached onto the front portion of eyeglasses body by means of holding means utilizing a magnetic force.

The front hook eyeglasses have the construction that a pair of first magnetizing means (magnets) are embedded into the lower surface of a bridge of the front hook eyeglasses at portions close to both ends thereof while they are exposed and substantially flush with the surface of the bridge.

A bridge of the eyeglasses body on which the bridge of the front hook eyeglasses (hereinafter referred to front hook bridge) can be mounted has a pair of second magnetizing means (magnets) corresponding to the first magnetizing means embedded into the upper surface of the bridge at portions close to both ends of the upper surface of the bridge while they are exposed and substantially flush with the upper surface of the bridge.

With such construction, the front hook eyeglasses can be attached onto the eyeglasses body with safety by magnetizing between the first and second magnetizing means while the bridge of the front hook bridge is placed on the upper surface of the bridge of the eyeglasses body. Further, even if the front hook eyeglasses are repeatedly detached from or attached onto the eyeglasses body, the lenses of the eyeglasses body are not damaged.

However, according to the conventional method of attaching the front hook eyeglasses onto the eyeglasses body, the front hook eyeglasses are placed on the eyeglasses body by merely magnetizing the first magnetizing means provided on the central portion (front hook bridge) of the former relative to the second magnetizing means provided on the central portion (bridge) of the latter.

The holding of the front hook eyeglasses relative to the eyeglasses body only by a magnetic or magnetizing force does not always secure the attachment therebetween. The reason is that the front hook eyeglasses held by the eyeglasses body are liable to swing about the central portion (front hook bridge) serving as a fulcrum. More in detail, since both ends of the front hook eyeglasses are in a free state where they are not supported by the eyeglasses body, a play is produced in the front and rear sides thereof (vertical direction relative to the surfaces of lenses) and the upper and lower sides thereof (direction of the surfaces of lenses). Accordingly, the state of attachment of the front hook eyeglasses relative to the eyeglasses body is very unstable.

Further, the first and second magnetizing means are respectively provided on narrow regions, namely, the front hook bridge and the bridge of the front hook eyeglasses and eyeglasses body. Although, attachment holes in which magnets are embedded are bored normally by a drill or the like, it requires a high skill and technique to bore the attachment holes in the narrow regions by a given depth.

Still further, boring of the attachment holes in the bridge of the eyeglasses body at two spots (recesses are defined in the bridge) which has to be prevented from being damaged as much as possible is inconvenient in view of external appearance, and also increases manufacturing steps. Further, metal is used and hence it can not be lightweight.

SUMMARY OF THE INVENTION

The invention has been developed to solve the foregoing problems of the conventional front hook eyeglasses and the method of attaching the front hook eyeglasses onto the eyeglasses body.

It is therefore an object of the invention to provide front hook eyeglasses which can be attached onto an eyeglasses body with assurance in a stable state without producing a play therebetween and a method of attaching the front hook eyeglasses onto the eyeglasses body.

It is another object of the invention to provide front hook eyeglasses which can be simplified in construction so that the front hook eyeglasses are rendered lightweight and easily manufactured and a method of attaching the front hook eyeglasses onto an eyeglasses body.

Meanwhile, the inventor of this application endeavored himself to study the foregoing problems and has solved the conventional problems by rendering a curvature of front curve of the portion of the front hook eyeglasses large, based on which the invention has been completed.

That is, a method of attaching front hook eyeglasses onto an eyeglasses body according to a first aspect of the invention includes the steps of rendering a curvature of a front curve of the front hook eyeglasses B larger than that of the eyeglasses body A, attaching a central portion of the front hook eyeglasses B onto a central portion of the eyeglasses body A, and bringing both ends of the front hook eyeglasses B into elastic contact with the eyeglasses body A.

A method of attaching front hook eyeglasses B onto an eyeglasses body A according to a second aspect of the invention includes the steps of rendering a curvature of a front curve of the front hook eyeglasses B larger than that of the eyeglasses body A, mutually engaging a bridge of the front hook eyeglasses B with that of the eyeglasses body A, and bringing both ends of the front hook eyeglasses B into elastic contact with the eyeglasses body A.

Front hook eyeglasses B to be attached onto an eyeglasses body A according to a third aspect of the invention include a pair of lenses and a bridge for connecting the pair of lenses thereto, wherein a curvature of the front curve of the front hook eyeglasses B is larger than that of the eyeglasses body A and the bridge of the front hook eyeglasses B is engageable with that of the eyeglasses body A.

The front hook eyeglasses B according to a fourth aspect of the invention is characterized in that the bridge of the front hook eyeglasses B is engageable with that of the eyeglasses body A such that the former is inserted into the latter from the outside of the former.

The front hook eyeglasses B according to a fifth aspect of the invention is characterized in that the bridge of the front hook eyeglasses B is engageable with that of the eyeglasses body A such that the former is inserted into the latter from the outside of the former.

The front hook eyeglasses B according to a sixth aspect of the invention is characterized in that the bridge of the front hook eyeglasses B is engageable with that of the eyeglasses body A such that the former is inserted into the latter from the upper outside of the former.

The front hook eyeglasses B according to a seventh aspect of the invention is characterized in that the bridge of the front hook eyeglasses B is formed of a thermoplastic synthetic resin and both ends of the bridge of the front hook eyeglasses B are inserted into small holes defined in the pair of lenses of the front hook eyeglasses B and are fixed to the pair of lenses by welding.

The front hook eyeglasses B according to an eighth aspect of the invention is characterized in that the bridge of the front hook eyeglasses B is formed of an elastomer and both ends of the bridge of the front hook eyeglasses B are inserted into small holes defined in the pair of lenses of the front hook eyeglasses B and are elastically fixed to the pair of lenses by welding.

Further, it is possible to employ the construction of the combination of not less than a selected two of the foregoing third to eighth aspects of the invention if the combination achieves the objects of the invention.

Inasmuch as the invention has the foregoing construction, the front hook eyeglasses can be attached onto the eyeglasses body with assurance in a stable state without producing a play therebetween.

Still further, since the front hook eyeglasses are simplified in construction, they can be rendered lightweight and manufactured with ease.

BRIEF DESCRIPTION OF THE DRAWINGS

FIGS. 3(A), (B) and (C) are views each showing a bridge of the front hook eyeglasses in FIG. 1, wherein FIG. 3(A) is a front view thereof.

PREFERRED EMBODIMENT OF THE INVENTION

Front hook eyeglasses and a method of attaching front hook eyeglasses onto an eyeglasses body according to first and second embodiments of the invention are described with reference to FIGS. 1 to 9.

Figure 1:
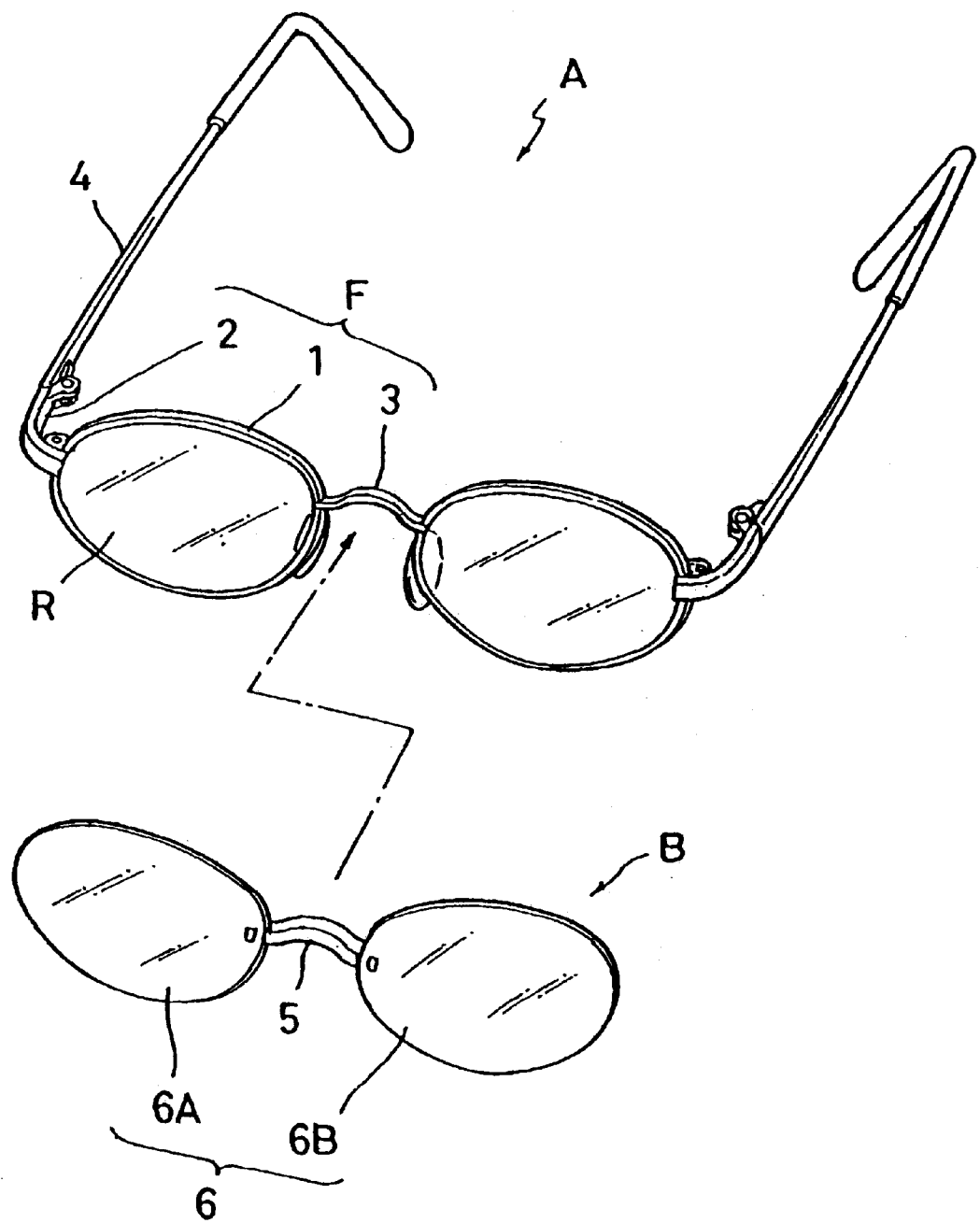
FIG. 1 shows a perspective view showing an attachment state between the front hook eyeglasses and the eyeglasses body before the former is attached onto the latter according to a first embodiment of the invention.
Figure 2:
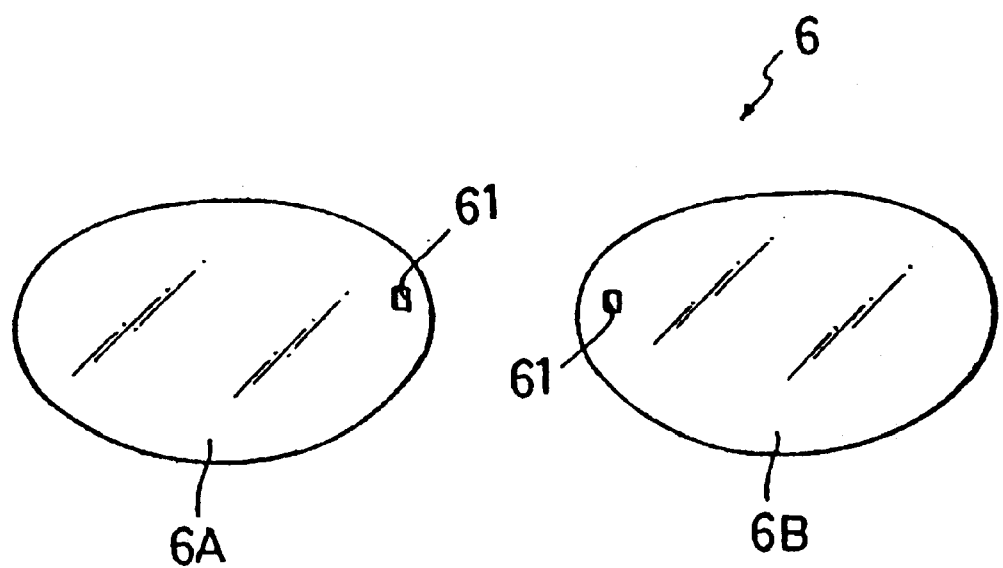
FIG. 2 is a view of lenses constituting the front hook eyeglasses in FIG. 1.
Figure 3A:
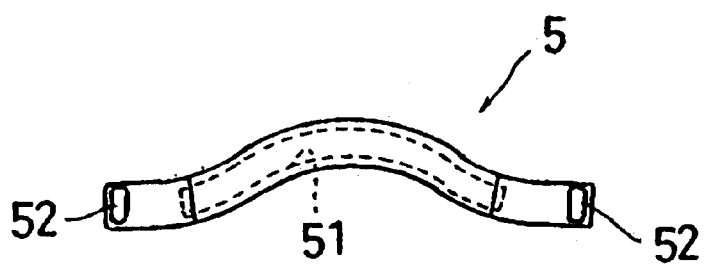
Figure 3B:
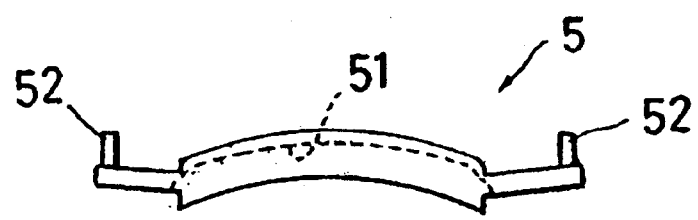
FIG. 3(B) is a plan view thereof and FIG. 3(C) is a rear view thereof.
Figure 3C:
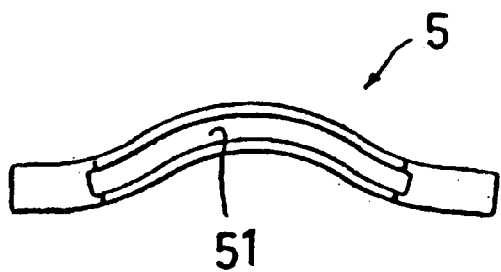

First Embodiment (FIGS. 1 to 6):

FIG. 1 shows a perspective view showing an attachment state between the front hook eyeglasses B and an eyeglasses body A before the former is attached onto the latter according to the first embodiment of the invention, FIG. 2 is a view showing lenses constituting the front hook eyeglasses B in FIG. 1, and FIGS. 3(A), (B) and (C) are views showing a bridge constituting the front hook eyeglasses B in FIG. 1, wherein FIG. 3(A) is a front view thereof, FIG. 3(B) is a plan view thereof and FIG. 3(C) is a rear view thereof.

As shown in FIG. 1, front hook eyeglasses B according to the invention are attached onto the eyeglasses body A at the front portion F (comprising rim frame 1, a bridge 3, lenses R) provided with lenses R for correcting eyesight with stability.

The eyeglasses body A used in the invention is briefly described hereinafter.

The eyeglasses body A comprises the rim frame 1 for holding and fixing the peripheries of a pair of lenses R thereto, the bridge 3 for connecting the rim frame 1 thereto symmetrically with each other, brackets 2 (normally so-called lugs) provided at the end of each rim frame 1, a temple 4 attached to each bracket 2 to be turned freely, and it is so-called full rim eyeglasses.

Then, the front hook eyeglasses B are described next.

The front hook eyeglasses B comprise a pair of shading lenses 6 (6A, 6B) and a bridge 5 for connecting the pair of shading lenses 6 (6A, 6B).

As shown in FIG. 2, the shading lenses 6 of the front hook eyeglasses B employ plastic lenses or the like having shading function such as UV cut function and have shapes substantially corresponding to lenses R of the eyeglasses body A or shapes different from the lenses R from a designing point of view. The plastic lenses employed by the shading lenses 6 are relatively thin in thickness and light in weight. Small holes 61 are bored in the shading lenses 6 so as to be connected to the bridge 5, described later, and have shapes corresponding to connection protrusions 52 of the bridge 5.

A central portion of the front hook eyeglasses B is attached onto and supported by a central portion of the eyeglasses body A. More in detail, the bridge 5 disposed at the central portion of the front hook eyeglasses B is attached to the bridge 3, disposed at the central portion of the eyeglasses body A.

Although there have been proposed some methods to attach such front hook eyeglasses B onto the eyeglasses body A, the bridge 5 of the front hook eyeglasses B of the invention is formed to be engageable with the bridge 3 of the eyeglasses body A so as to be inserted from the outside of the eyeglasses body A.

That is, the bridge 5 serves as supporting means for supporting front hook eyeglasses B by the eyeglasses body A (serves as a first supporting portion of the front hook eyeglasses B, described later).

The bridge 5 has a recessed groove 51 corresponding to the bridge 3 of the eyeglasses body A (see FIG. 3(C)). More in detail, the recessed groove 51 of the bridge 5 has a size through which the bridge 5 engages in the bridge 3 of the eyeglasses body A with accuracy whereby the front hook eyeglasses B when attached to the eyeglasses body A are prevented from being displaced vertically (up and down), horizontally (right and left) and back and forth.

When forming the recessed groove 51 on the bridge 5, the bridge 5 of the front hook eyeglasses B is formed such that it is engageable with the bridge 3 so as to be inserted into or installed onto the bridge 3 from the front portion of the bridge 3 (see FIG. 1).

Meanwhile, when the front hook eyeglasses B are attached onto the eyeglasses body A, modifications of a protrusion 51A of the bridge 5 are exemplified and depicted by (I) to (VI) in FIGS. 6(A), (B) so as to fix the former to the latter with more assurance, wherein FIG. 6(A) is a rear view of the bridge 5 and FIG. 6(B) is a central sectional view showing a state where the bridge 5 of the front hook eyeglasses B in FIG. 6(A) is engaged in the bridge 3 of the eyeglasses body A. The protrusion 51A is provided in the recessed groove 51 of the bridge 5 to protrude inward the recessed groove 51. The protrusion 51A is retained by the side surface of the bridge 3 of the eyeglasses body A while the former is engaged with the latter, so as to function for preventing the front hook eyeglasses B from detaching from the eyeglasses body A so that the front hook eyeglasses B can be attached onto the eyeglasses body A with stability.

For example, if the protrusion 51A is provided on the recessed groove 51, it is retained by the rear surface of the bridge 3 of the eyeglasses body A while the former is engaged with the latter.

The modifications (I) to (VI) are described as follows.

The modification (I) has a hook-like protrusion 51A provided at one side of the recessed groove 51.

The modification (II) has a hook-like protrusions 51A provided at both upper and lower portions of the recessed groove 51.

The modification (III) has a semicircular protrusion 51A provided at one side, i.e., upper side in the recessed groove 51.

The modification (IV) has a triangular protrusions 51A provided at both sides, i.e., upper and lower sides in the recessed groove 51.

The modification (V) has a plurality of triangular protrusions 51A (two in this modification) provided at one side, i.e., upper side in the recessed groove 51.

The modification (VI) has a plurality of semicircular protrusions 51A (five in this modification) provided at both sides, i.e., upper and lower sides in the recessed groove 51.

The shape of the protrusion 51A can be appropriately selected if the protrusion 51A can be engaged with the side surface of the bridge 3 of the eyeglasses body A while the bridge 3 is retained by the recessed groove 51, and the number of the protrusion 51A is not limited to the foregoing modifications (I) to (VI).

The connection protrusions 52 to be attached to or inserted into the small holes 61 of the shading lenses 6 of the front hook eyeglasses B are provided on both ends of the bridge 5 of the front hook eyeglasses B (see FIGS. 3(A), (B)). It is preferable that the shape of each connection protrusion 52 is elliptical so as to prevent the shading lenses 6 per se from being turned. The shape of each connection protrusion 52 of the bridge 5 is not limited to the elliptical one if it has a function to prevent the shading lenses 6 from being turned, and it may be triangular or rectangular in cross section or any other shapes in cross section. In this case, it is a matter of course that the shapes of the small holes 61 of the shading lenses 6 have to conform to the shapes of the connection protrusions 52.

As a material of the bridge 5 of the front hook eyeglasses B, an elastic synthetic resin, for example, a thermoplastic synthetic resin or elastomer or the like is used. When such a material is used, the front hook eyeglasses B can be elastically engaged in the eyeglasses body A with ease. However, fixing means of the connection protrusions 52 is varied depending on a material of the bridge 5, which is described now more in detail.

In case that the bridge 5 is formed of a thermoplastic synthetic resin:

After the connection protrusions 52 of the bridge 5 are inserted into the small holes 61 of the shading lenses 6, the tip portions of the connection protrusions 52 protruding from the small holes 61 are crushed and welded by heat so that the bridge 5 is fixed to the shading lenses 6 (not shown). After the bridge 5 is welded to the shading lenses 6, the shading lenses 6 are fixed to the bridge 5 with assurance, and hence a play is not produced therebetween.

In case that the bridge 5 is formed of an elastomer:

An outer diameter of each connection protrusion 52 to be used in the first embodiment is slightly larger than an inner diameter of each small hole 61, and hence an elastic pressing effect is produced between the connection protrusions 52 and small holes 61. Accordingly, the connection protrusions 52 can be strongly pressed into the small holes 61 so that the former can be elastically pressurized and fixed to the latter. In this case, since the forgoing welding means is not employed, there is an advantage that bridge 5 can be simply and safely fixed to the shading lenses 6. Further, since the bridge 5 of the front hook eyeglasses B can be replaced by another bridge, it is possible to freely select any color combination with respect to the shading lenses 6 and bridge 5.

An important feature of the invention resides in that a curvature of a front curve (face curve) of the front hook eyeglasses B is set to be larger than that of the eyeglasses body A. In other words, a radius of the curvature of the front curve (face curve) of the front hook eyeglasses B is set to be smaller than that of the eyeglasses body A.

When the front hook eyeglasses B are attached onto the eyeglasses body A, the bridge 5 positioned at the central portion of the front hook eyeglasses B is attached to the bridge 3 positioned at the central portion of the eyeglasses body A. At the result, the front curve of the front hook eyeglasses B is naturally gently deformed compared with the original state. That is, if the curvature of the front curve of the front hook eyeglasses B becomes small (in other words, the radius of the curvature of front curve becomes large), a reaction force for the front hook eyeglasses B to restore to the original state is generated with a reaction thereto.

Accordingly, both ends of the front hook eyeglasses B, namely, remote ends of the respective shading lenses 6 elastically press the eyeglasses body A. As a result, the front hook eyeglasses B are elastically brought into contact with the eyeglasses body A, and hence a play between both ends of the front hook eyeglasses B in back and forth and up and down directions can be prevented (which serve as second and third supporting portions of the front hook eyeglasses B).

Meanwhile, there are following methods for rendering the curvature of the front curve of the front hook eyeglasses B larger than that of the eyeglasses body A.

First method is to render the curve of each shading lens 6 large.

Second method is to render the bending degree or extent of the bridge 5 per se large.

Third method is to render a connection angle between the shading lenses 6 and bridge 5 large.

Although these three methods are exemplified, it is a matter of fact that other methods can be employed if the forgoing conditions are satisfied so as to manufacture the front hook eyeglasses B.

Figure 4:
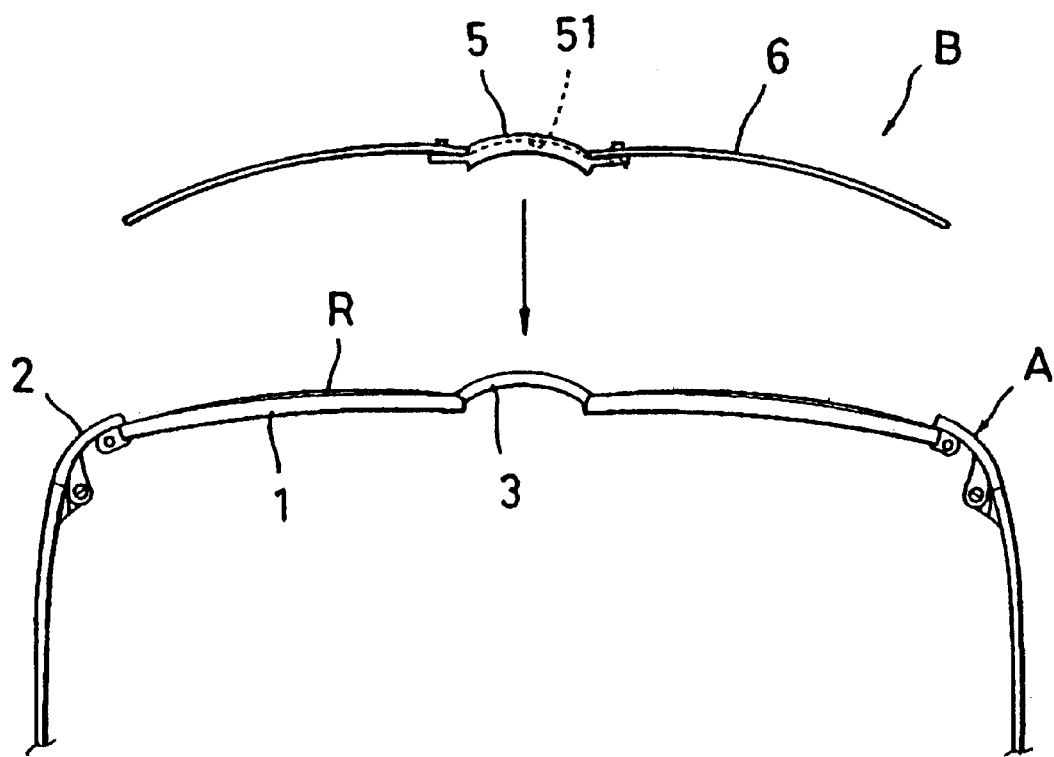
FIG. 4 is a plan view showing an attachment state between the front hook eyeglasses and the eyeglasses body before the former is attached onto the latter in FIG. 1.
Figure 5:
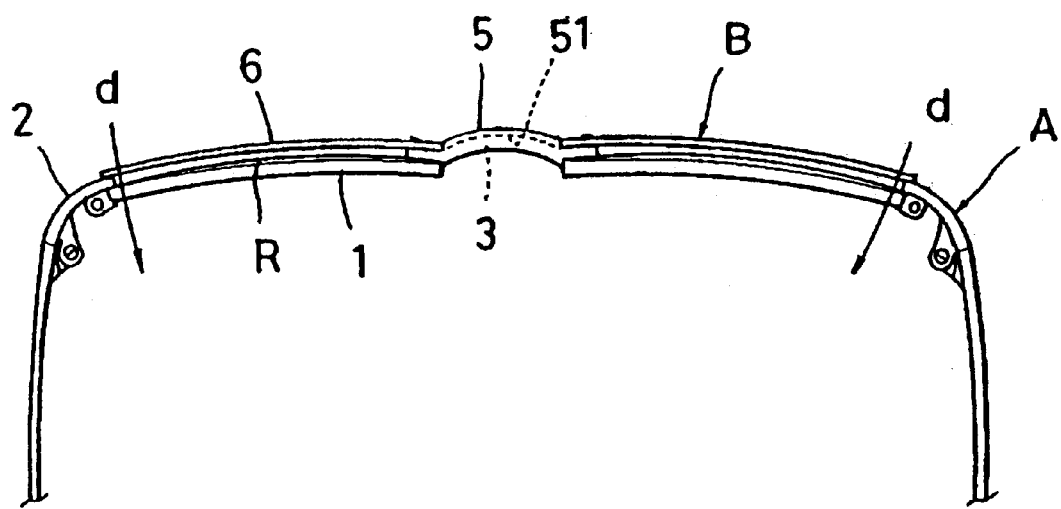
FIG. 5 is a plan view showing an attachment state between the front hook eyeglasses and the eyeglasses body after the former is attached onto the latter in FIG. 1.
Figure 6:
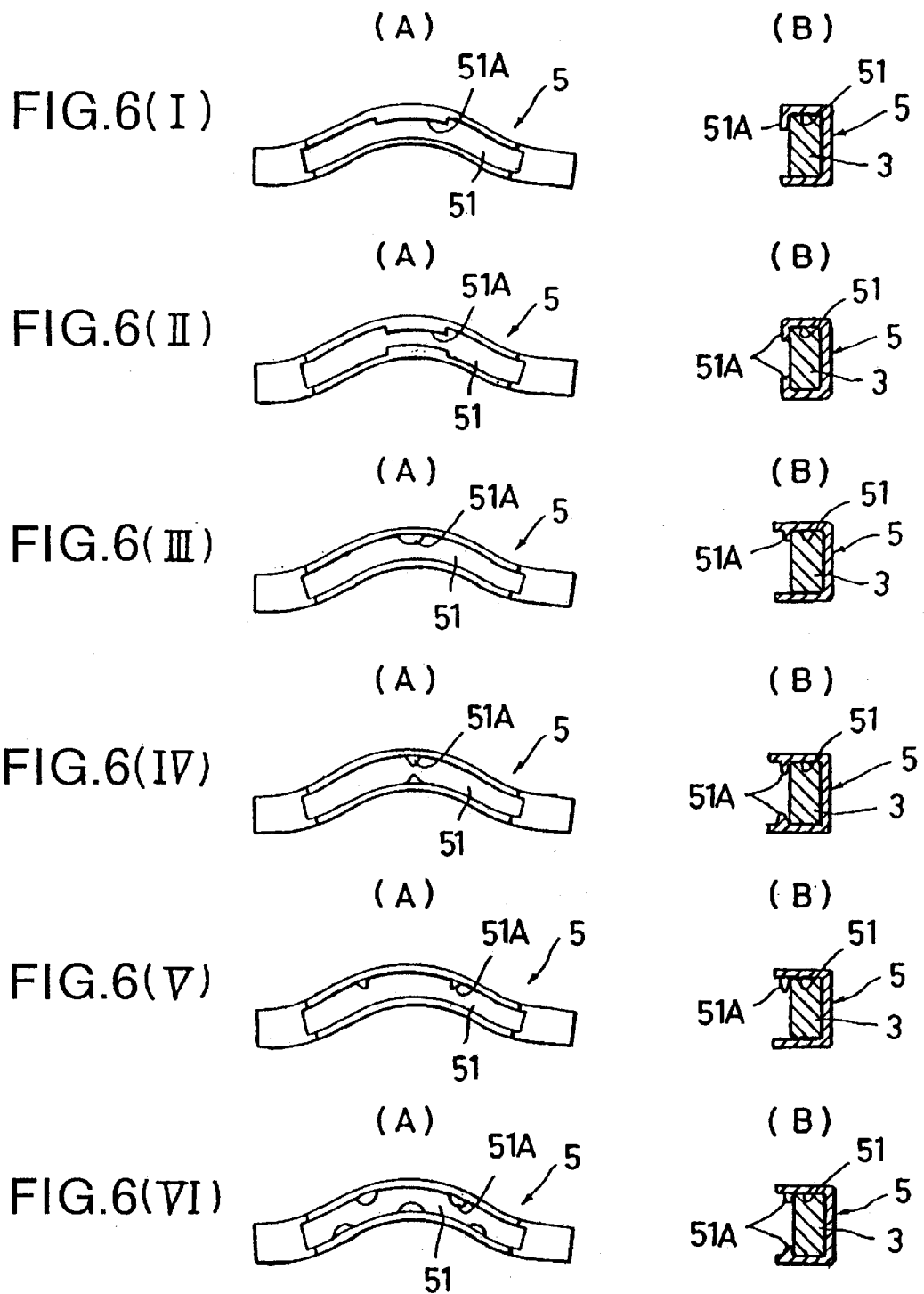
FIGS. 6(A) to (B) are views showing modified examples of bridges of the front hook eyeglasses as depicted by modifications (I) to (VI)

FIG. 4 is a plan view showing an attachment state between the front hook eyeglasses B of the invention and the eyeglasses body A before the former is attached onto the latter. FIG. 5 is a plan view showing an attachment state between the front hook eyeglasses B of the invention and the eyeglasses body A after the former is attached onto the latter.

When the front hook eyeglasses B are attached onto the eyeglasses body A, the bridge 5 of the front hook eyeglasses B is pressed against the bridge 3 of the eyeglasses body A from the front portion of the eyeglasses body A to the rear portion thereof (in the direction perpendicular to the lens surfaces) using fingers in an initial state shown in FIG. 4. The bridge 3 is engaged with the recessed groove 51 of the front hook eyeglasses B mutually by the pressing force of the fingers (see FIG. 5). As set forth immediately before, the front hook eyeglasses B can be easily attached onto the eyeglasses body A with a single motion.

After the front hook eyeglasses B are attached onto the eyeglasses body A, the curvature of the front curve of the front hook eyeglasses B becomes smaller than that before the front hook eyeglasses B are attached onto the eyeglasses body A. Accordingly, as mentioned above, a reaction force caused by the deformation of the front curve is produced in both ends of the front hook eyeglasses B (remote both ends of the shading lenses 6), thereby pressing the eyeglasses body A (see arrows d in FIG. 5). The pressing force against the eyeglasses body A produced in both ends of the front hook eyeglasses B acts uniformly on the right and left sides of the eyeglasses body A.

As mentioned in detail, the front hook eyeglasses B of the invention can be elastically supported by and attached onto the eyeglasses body A at three points, namely, at the first supporting portion by the bridge 5 of the front hook eyeglasses B, and second and third supporting portions by both ends of the front hook eyeglasses B.

That is, the bridge 5 serving as the first supporting portion of the front hook eyeglasses B is fixed to the eyeglasses body A in a state where the bridge 5 is engaged with the bridge 3 of the eyeglasses body A from the outside of the eyeglasses body A while both ends of the front hook eyeglasses B serving as the second and third supporting portions of the front hook eyeglasses B press the eyeglasses body A, namely, press the bracket 2 of the eyeglasses body A at both ends.

With the first to third supporting portions, it is possible to control or restrain the motion of the bridge 5 relative to the eyeglasses body A with accuracy, namely, motion in a vertical direction (in the direction of lens surfaces), i.e., vertical displacement, motion in a right and left direction (in the direction of lens surfaces), i.e., horizontal displacement, and motion in a back and forth direction (in the direction perpendicular to the lens surfaces), so that the front hook eyeglasses B can be always attached onto the eyeglasses body A with safety while a play is not produced between the front hook eyeglasses B and eyeglasses body A.

Further, according to the method of attaching the front hook eyeglasses B onto the eyeglasses body A of the first embodiment of the invention, even if an undue stress is applied to the rim frame 1 of the eyeglasses body A so that the rim frame 1 is distorted and deformed, the bridge 5 of the front hook eyeglasses B is fixed to the bridge 3 of the eyeglasses body A with assurance so that both ends of the front hook eyeglasses B are always elastically supported by the eyeglasses body A.

That is, the attachment between the front hook eyeglasses B and eyeglasses body A is stabilized because the supporting state therebetween by the first, second and third supporting portions are not changed even if the eyeglasses body A is deformed.

Further, the front hook eyeglasses B of the first embodiment of the invention can dispense with a recess forming process for embedding magnets into the bridge of the eyeglasses body A as made in the conventional method, and hence the bridge 3 of the eyeglasses body A can be used without being damaged. Still further, since the eyeglasses body A has the construction not to embed the magnets therein, it is possible to return an ordinarily wearing eyeglasses body A to a simple original design, and hence it is excellent in an external appearance.

Still further, both the eyeglasses body A and front hook eyeglasses B are reduced in the number of components thereof and simplified in construction so that they can be manufactured with a low cost, which is convenient from an economical point of view.

Figure 7:
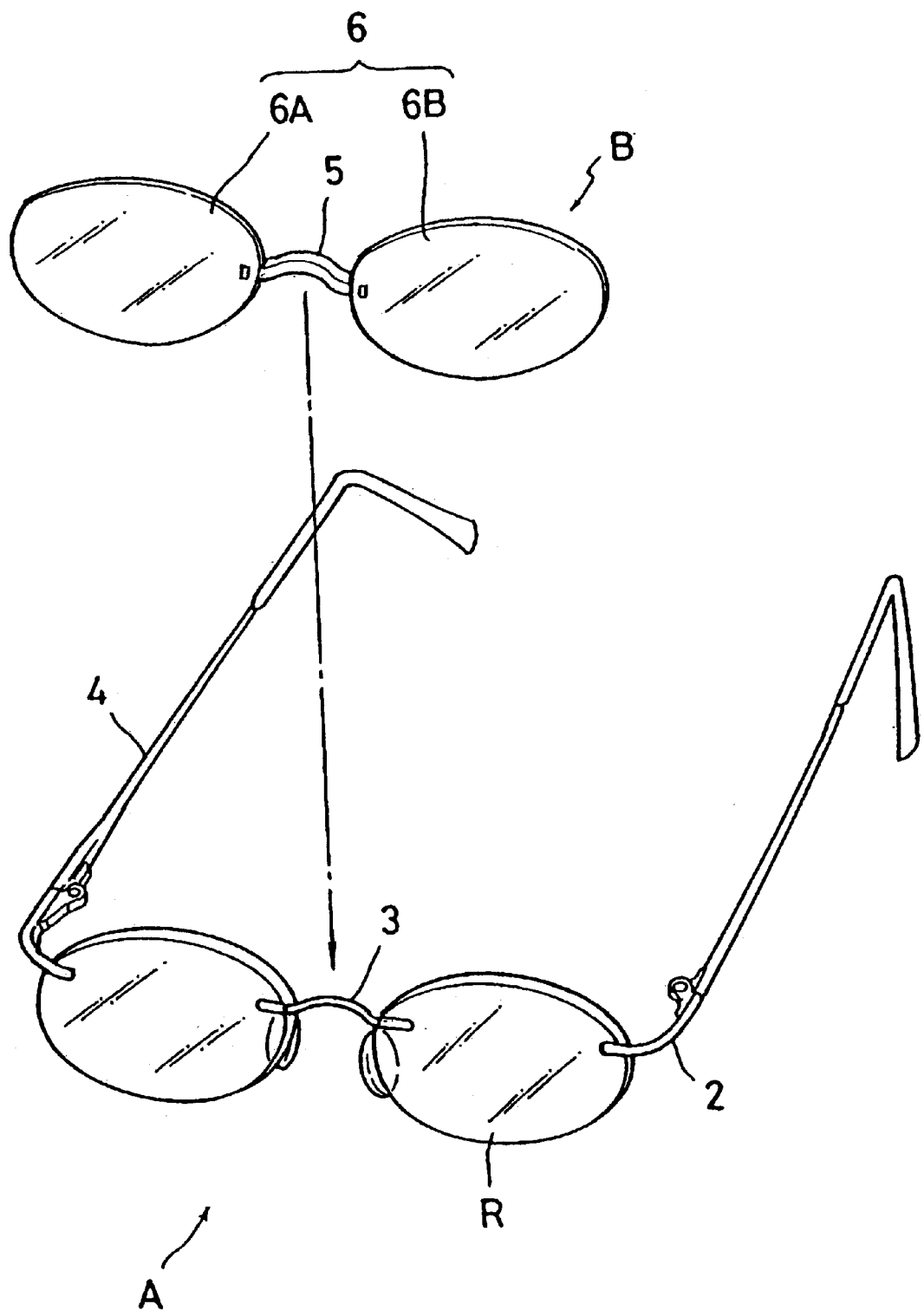
FIG. 7 shows a perspective view showing an attachment state between the front hook eyeglasses and the eyeglasses body before the former is attached onto the latter according to a second embodiment of the invention.
Figure 8:
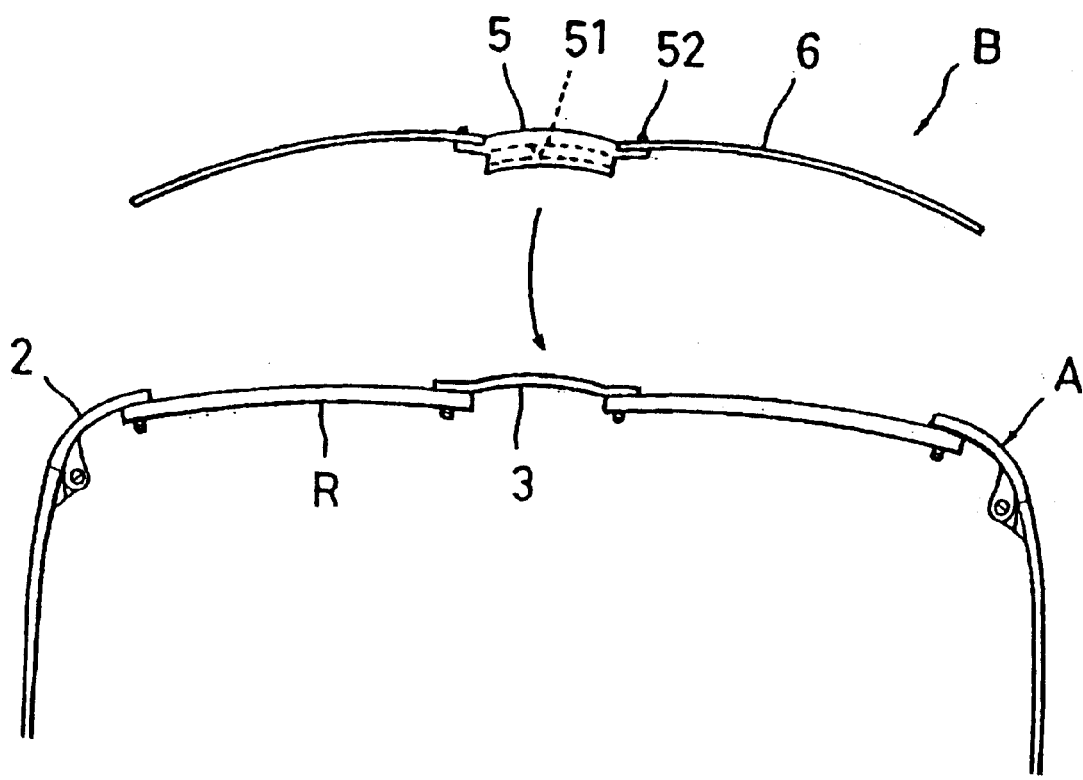
FIG. 8 shows a plan view showing an attachment state between the front hook eyeglasses and the eyeglasses body before the former is attached onto the latter in FIG. 7.
Figure 9:
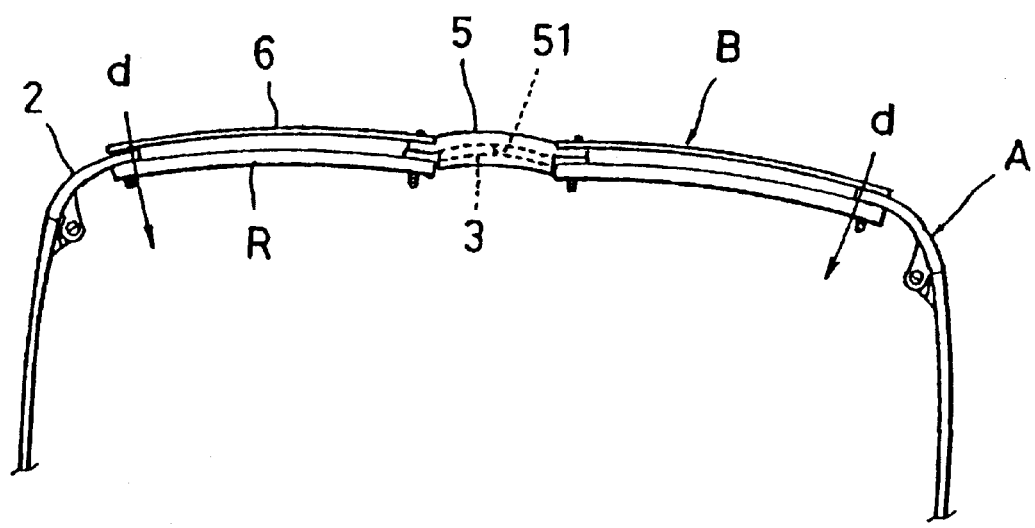
FIG. 9 shows a plan view showing an attachment state between the front hook eyeglasses and the eyeglasses body after the former is attached onto the latter in FIG. 7.

Second Embodiment (FIGS. 7 to 9):

FIG. 7 shows a perspective view showing an attachment state between the front hook eyeglasses B and the eyeglasses body A before the former is attached onto the latter according to the second embodiment of the invention, FIG. 8 shows a plan view showing an attachment state between the front hook eyeglasses B and the eyeglasses body A before the former is attached onto the latter in FIG. 7, and FIG. 9 shows a plan view showing an attachment state between the front hook eyeglasses B and the eyeglasses body A after the former is attached onto the latter in FIG. 7.

An eyeglasses body A dispenses with the rim frame 1 used in the first embodiment for fixing the periphery of each lens R for correcting eyesight to the rim frame 1, and a bridge 3 and each bracket 2 are attached directly to the each lens R, namely, it is so-called two components attachment type rimless eyeglasses.

The rimless glasses are wider in visual field because an obstruct such as the rim frame is dispensed with so that the obstruct such as the rim frame is invisible in the visual field, and also it is light in weight and is accord with the latest fashion mode.

A basic construction of the front hook eyeglasses B in the second embodiment is the same as that of the front hook eyeglasses B in the first embodiment except that a recessed groove 51 of a bridge 5 of the front hook eyeglasses B is engageable with the bridge 3 of the eyeglasses body A to be inserted from the outside of the bridge 3 from the upper outside of the eyeglasses body A (see FIGS. 7 and 8).

Accordingly, when the front hook eyeglasses B are attached onto the eyeglasses body A, the bridge 5 of the front hook eyeglasses B are pressed downward against the bridge 3 of the eyeglasses body A using fingers in an initial state shown in FIGS. 7 and 8. In such a manner, the front hook eyeglasses B can be attached onto the eyeglasses body A by a single motion.

Although the invention has been described in detail above, it is needless to say that the invention is not limited to the first and second embodiments but can be modified variously without departing from the gist of the invention.

Although the invention has been explained with reference to the full rim eyeglasses and two component attachment type rimless eyeglasses, it is needless to say to employ other types of eyeglasses such as half rim eyeglasses in which the upper half or lower half of the lenses are supported by a rim frame, and they are excellent for general purposes.

Further, the method of attaching the front hook eyeglasses onto the eyeglasses body using the bridge according to the first embodiment of the invention can be applied to the second embodiment or vice versa.

Although both ends of the front hook eyeglasses as explained as first and second embodiments of the invention are exemplified to elastically press the bracket of the eyeglasses body, it is sufficient to elastically press a part of the eyeglasses body, for example, lenses of the eyeglasses body.

Shading lenses used by the front hook eyeglasses may be formed of color lenses, polarizing lenses and other lenses.

As mentioned in detail, the front hook eyeglasses can be easily attached onto the eyeglasses body with a single motion. The invention also relates to the method of attaching the front hook eyeglasses onto the eyeglasses body utilizing an elastic pressing force utilizing three point supporting portions wherein the former can be always attached onto the latter with stability without producing any play therebetween.

That is, in the front hook eyeglasses attached onto the eyeglasses body, vertical or horizontal motion (vertical and horizontal displacement) of the front hook eyeglasses or back and forth motion of the front hook eyeglasses are controlled or restrained.

Further, the front hook eyeglasses are excellent in general purpose because they can be attached onto any kind of eyeglasses body such as rimless, half-rim or full-rim eyeglasses.

Still further, the construction of attachment between the front hook eyeglasses and eyeglasses body can be simplified to the maximum, and the number of components the front hook eyeglasses can be reduced as much as possible so that the front hook eyeglasses become light in weight and are reduced in manufacturing cost.

In addition, the method of the invention does not employ a clip or magnets as holding means of the front hook eyeglasses which have been conventionally employed by the conventional front hook eyeglasses so that the lenses of the eyeglasses body are not damaged or a design of the eyeglasses body is not deteriorated. It is preferable that the front hook eyeglasses are engageable with the eyeglasses body from the front portion thereof rather than from the upper portion thereof in view of design thereof.

Although particular preferred embodiments of the invention has been disclosed in detail for illustrative purposes, it will be recognized that variations or modifications of the disclosed apparatus, including the rearrangement of parts, lie within the scope of the present invention.

What is claimed is:

1. A method of attaching a lens assembly to a pair of eyeglasses wearable on the head of a user, said method comprising the steps of:

providing a lens assembly and a pair of eyeglasses, the lens assembly having a greater curvature than a curvature of the pair of eyeglasses;

attaching a central portion of the lens assembly to a central portion of the pair of eyeglasses; and positioning opposite ends of the lens assembly in elastic contact with the pair of eyeglasses.

2. The method of claim 1 wherein said step of positioning comprises deforming the lens assembly to decrease the curvature thereof such that the opposite ends of the lens assembly resiliently engage respective outer edge regions of the pair of eyeglasses to prevent movement of the lens assembly relative thereto.

3. The method of claim 2 wherein said step of attaching further comprises pressing the central portion of the lens assembly against the central portion of the pair of eyeglasses from the front towards the rear in a direction generally perpendicular to surfaces of respective lenses of the pair of eyeglasses.

4. The method of claim 2 wherein said step of attaching further comprises pressing the central portion of the lens assembly against the central portion of the pair of eyeglasses in a downward direction.

5. A method of attaching a lens assembly to a pair of eyeglasses wearable on the head of a user, said method comprising the steps of:

providing a lens assembly and a pair of eyeglasses, the lens assembly having a greater curvature than a curvature of the pair of eyeglasses;

mutually engaging a bridge of the lens assembly and a bridge of the pair of eyeglasses; and positioning opposite ends of the lens assembly in elastic contact with the pair of eyeglasses.

6. The method of claim 5 wherein the lens assembly has a first curvature when same is not mounted on the pair of eyeglasses which is greater than the curvature of the pair of eyeglasses, said step of mutually engaging further comprising mutually engaging the respective bridges and causing deformation the lens assembly so as to define a second curvature which is less than the first curvature such that opposite ends of the lens assembly are positioned in resilient but firm contact with outer edge regions of the pair of eyeglasses.

7. A lens assembly for removable attachment to a pair of eyeglasses having a pair of lenses connected to one another by a bridge, said lens assembly comprising a pair of lenses and a bridge connecting said lenses to one another and configured for engagement with the bridge of the pair of eyeglasses, the lens assembly defining a curvature which is greater than a curvature defined by the pair of eyeglasses.

8. The lens assembly of claim 7 wherein said curvature of said lens assembly is defined by a radius of curvature which is less than a radius of curvature defining the curvature of the pair of eyeglasses such that when said lens assembly is mounted on the pair of eyeglasses, said lens assembly is elastically deformed so as to resiliently but firmly engage opposite outer edge regions of said lens assembly with respective outer edge regions of the pair of eyeglasses.

9. The lens assembly of claim 8 wherein the bridge of the lens assembly is formed from a thermoplastic synthetic resin and opposite terminal ends of the bridge of the lens assembly are respectively inserted into holes defined in the respective lenses of the lens assembly, the terminal ends being fixed to the respective lenses by welding.

10. The lens assembly of claim 8 wherein the bridge of the lens assembly is formed from an elastomer and opposite terminal ends of the bridge of the lens assembly are respectively inserted into small holes defined in the respective lenses of the lens assembly and elastically fixed therein.

11. The lens assembly of claim 7 wherein said curvature of said lens assembly is defined by a radius of curvature generated from a generally vertical axis when the lens assembly is worn on the head of a forwardly facing user, and the bridge of the lens assembly is engageable with the bridge of the pair of eyeglasses from a position outside thereof.

12. The lens assembly of claim 7 wherein the lens assembly is mounted on the pair of eyeglasses by pressing the bridge of the lens assembly against the bridge of the pair of eyeglasses from the front towards the rear in a direction generally perpendicular to surfaces of the lenses of the pair of eyeglasses.

13. The lens assembly of claim 12 wherein said bridge of said lens assembly defines therein a recess which opens rearwardly towards a face of a forwardly facing user, and the bridge of the pair of eyeglasses is engaged within said recess when said lens assembly is mounted thereon.

14. The lens assembly of claim 13 wherein said bridge of said lens assembly defines therein a recess which opens downwardly with respect to a face of a forwardly facing user, and the bridge of the pair of eyeglasses is engaged within said recess when said lens assembly is mounted thereon.

15. The lens assembly of claim 7 wherein the lens assembly is mounted on the pair of eyeglasses by pressing the bridge of the lens assembly against the bridge of the pair of eyeglasses downwardly in a direction generally parallel with surfaces of the lenses of the pair of eyeglasses.

16. The lens assembly of claim 7 wherein said bridge of said lens assembly includes a pair of elongate and continuous bridge walls which are spaced from one another to define a recess therebetween in which the bridge of the pair of eyeglasses is engaged, said recess being defined solely in said bridge.

17. Front hook eyeglasses for attachment to a pair of eyeglasses, the front hook eyeglasses including a pair of lenses and a bridge for interconnecting the pair of lenses to one another, wherein a curvature of the front hook eyeglasses is greater than a curvature of the pair of eyeglasses, the bridge of the front hook eyeglasses being engageable with a bridge of the pair of eyeglasses such that the front hook eyeglasses are mounted on the pair of eyeglasses from the front, the bride of the front hook eyeglasses including a retaining element engageable with the bridge of the pair of eyeglasses to prevent accidental detachment of the front hook eyeglasses therefrom.

18. An eyeglass arrangement comprising:
 a pair of eyeglasses including a pair of lenses, a bridge interconnecting said lenses, and an arrangement for supporting said eyeglasses on the head of a user; and
 a lens assembly detachably mounted on said eyeglasses and including a pair of lenses which are positioned over portions of the respective lenses of said eyeglasses, and a bridge interconnecting said lenses of said lens assembly and being removably attached to said bridge of said eyeglasses, said lens assembly defining a first radius of curvature when said lens assembly is not mounted on said eyeglasses, said first radius of curvature being smaller than a radius of curvature defined by said eyeglasses such that when said bridges are attached to one another, said lens assembly is deformed so as to define a second radius of curvature which is greater than said first radius of curvature to firmly engage opposite outer edge regions of said lens assembly with said eyeglasses.

19. The eyeglass arrangement of claim 18 wherein said outer edge regions of said lens assembly resiliently engage respective opposite outer edge regions of said eyeglasses to prevent movement of said lens assembly relative to said eyeglasses.

20. The eyeglass arrangement of claim 19 wherein said bridge of said lens assembly defines a recess therein and said bridge of said eyeglasses is disposed within said recess to removably attach said lens assembly to said eyeglasses.

21. The eyeglass arrangement of claim 20 wherein said recess opens rearwardly such that said lens assembly is mounted on said eyeglasses by pressing said bridge of said lens assembly against said bridge of said eyeglasses in a front to rear direction thereby engaging said bridge of said eyeglasses within said recess.

22. The eyeglass arrangement of claim 21 wherein said recess is defined by vertically spaced upper and lower walls of said bridge which project rearwardly from a generally upright front wall of said bridge, and a retaining element is provided on one of said upper and lower walls so as to traverse a portion of said recess, said retaining element engaging a portion of said bridge of said eyeglasses to prevent accidental detachment of said lens assembly from said eyeglasses.

23. The eyeglass arrangement of claim 22 wherein said retaining element when provided on said upper wall projects downwardly therefrom and when provided on said lower wall projects upwardly therefrom, said retaining element being spaced rearwardly from said front wall.

24. The eyeglass arrangement of claim 20 wherein said recess has a shape which corresponds to a shape of said bridge of said eyeglasses to permit a snug engagement of said bridge of said eyeglasses within said recess.

25. The eyeglass arrangement of claim 20 wherein said recess opens downwardly such that said lens assembly is mounted on said eyeglasses by pressing said bridge of said lens assembly against said bridge of said eyeglasses in a downward direction thereby engaging said bridge of said eyeglasses within said recess.

26. The eyeglass arrangement of claim 25 wherein said recess is defined by horizontally spaced front and rear walls of said bridge which project downwardly from a top wall of said bridge, and a retaining element is provided on one of said front and rear walls so as to traverse a potion of said recess, said retaining element engaging a portion of said bridge of said eyeglasses to prevent accidental detachment of said lens assembly from said eyeglasses.

* * * * *